F. NIELSEN.
DUST CAP.
APPLICATION FILED SEPT. 17, 1915.
1,309,215.
Patented July 8, 1919.
Fig. 1.
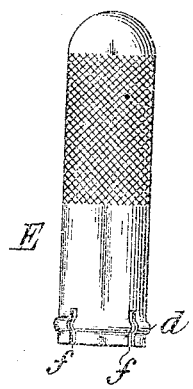
Fig. 2.
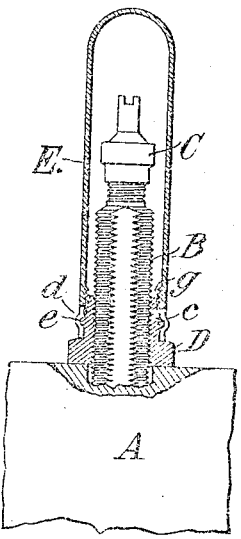
Fig. 4.
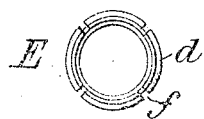
Fig. 3.
Fig. 5.
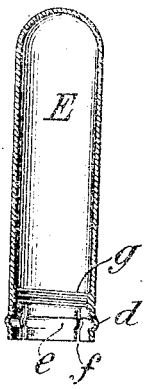
WITNESSES:
INVENTOR
Frederick Nielsen
By Attorneys,

UNITED STATES PATENT OFFICE.

FREDERIK NIELSEN, OF DORCHESTER, MASSACHUSETTS, ASSIGNOR TO A. SCHRADER'S SON INCORPORATED, OF BROOKLYN, NEW YORK, A CORPORATION OF NEW YORK.

DUST-CAP.

1,309,215.     Specification of Letters Patent.     Patented July 8, 1919.

Application filed September 17, 1915. Serial No. 51,121.

*To all whom it may concern:*

Be it known that I, FREDERIK NIELSEN, a citizen of the United States of America, residing in the city of Dorchester, county of Suffolk, and State of Massachusetts, have invented certain new and useful Improvements in Dust-Caps, of which the following is a specification.

This invention relates to dust caps for pneumatic tire valves such as are used principally on automobiles.

The object of the invention is to provide a dust cap which can be applied quickly with the minimum number of turns, and which will be unlikely to work loose.

The preferred construction of the dust cap provided by this invention is shown in the accompanying drawings, wherein:—

Figure 1 is an elevation of the cap;

Fig. 2 is a longitudinal mid-section showing it applied to the tire valve and rim nut;

Fig. 3 is an elevation of the rim nut;

Fig. 4 is an end view, and Fig. 5 a longitudinal section of the dust cap.

In Fig. 2, A is a part of a rim or felly, B is the usual air valve casing or tubular shell which is externally threaded as usual, and on the reduced threaded neck portion of which is shown the usual valve cap C. D is a rim nut which as usual screws on the external threads of the casing B and bears against the felly, thereby drawing the valve and the tire at its engagement therewith into place. E is the dust cap, which as usual incloses the valve casing and valve cap.

The rim nut D is as is best shown in Fig. 3 constructed with a neck portion *a* having a screwthread *b* at its end and a rib *c* (or equivalent projection) on the neck between the threaded part and the nut proper.

The dust cap E is formed at its open end with an annular corrugation *d*, forming thus an inner groove *e* which is adapted to make a close fit with the rib *c* on the rim nut. To enable the lower end of the dust cap to expand over such rib, it is longitudinally slotted at *f f* whereby the portions between these slots constitute slightly yielding elastic fingers. Within the dust cap above the corrugation *d* are formed screwthreads *g* which are adapted to engage the threads *b* on the nut.

To apply the cap, it is pushed forcibly onto the nut, so that its slotted end portion yields and rides over the rib *c*, until the screwthreads *g* abut against the screwthreads *b* of the nut; thereupon the cap is turned to engage the threads and screwed on for perhaps one or two turns. During this screwing on operation, the internal groove *e* comes into register with the rib *c* so that these parts interfit, as clearly shown in Fig. 2. The frictional cling of the slotted portion of the cap against the rib *c* has the function of a lock nut, not only frictionally resisting any tendency of the cap to turn, but imposing also a decided resistance against turning due to the fact that an unscrewing movement would forcibly spread the spring fingers before they could disengage their internal groove from the rib *c*. The slots *f* being very short, the intervening spring fingers are very stiff and have only sufficient yielding capacity to enable the dust cap to be forced over the rib *c*.

The dust cap thus provided is very quickly and easily applied or removed, when in place is free from any looseness or rattling, and affords adequate security against accidental unscrewing.

While the construction described is that preferred, yet the invention is susceptible of a reasonable degree of modification and the substitution of known equivalents.

I claim as my invention:—

1. The combination with a tire valve and rim nut, of a dust cap having a threaded engagement with said nut and having a slotted end portion yieldingly engaging the nut.

2. The combination with a tire valve and rim nut, the latter having a threaded and ribbed neck, of a dust cap having a slotted end portion and internal screw threads for engagement with said nut.

3. The combination with a tire valve and rim nut, the latter having a threaded and ribbed neck, of a dust cap having a slotted end portion with an internal groove fitting the ribbed portion of the nut and having internal screwthreads engaging the threaded neck of the nut.

4. A dust cap having its open end slotted forming yielding fingers, with a corrugation traversing said fingers and an internal screwthread.

5. A dust cap having a screw-threaded portion adapted to engage a threaded member and having a spring portion adapted to engage a complemental part on said threaded member.

6. A dust cap having a spring portion adapted to engage a complemental part, and having integrally therewith a distinct non-resilient internally threaded portion.

7. A dust cap having a substantially non-resilient internally threaded portion, adapted to screw on a complemental part, and having a spring portion adapted to engage externally such complemental part to prevent unscrewing.

8. A dust cap having a screw-threaded portion adapted to engage a threaded portion on a member of a tire valve, and a spring portion forming a continuation of the threaded portion and adapted to contract by its elasticity to engage such member, to prevent unscrewing.

9. A dust cap having a screw-threaded portion adapted to engage a threaded portion on a valve or other member, and a spring portion forming a continuation of the threaded portion and adapted to move by its elasticity to engage a part which is independent of the cap.

10. A dust cap having a slotted end formed with a corrugation adapted to engage a rib or the like, and said dust cap being also formed with a threaded portion.

11. A dust cap consisting of a hollow metal shell having an integral non-resilient internally-threaded portion, with resilient means engaging the part on which the cap screws for resisting the unscrewing of the cap.

12. A dust cap having a non-resilient portion formed with an internal thread, and a complemental part on which said cap screws, one of said parts having resilient means for engaging the other to oppose separation thereof.

13. The combination with a tire valve having an externally-threaded casing, of a rim nut screwing thereon, and a dust cap applied thereover against said rim nut, said cap consisting of a tubular metal shell having an integral internally-threaded portion and said cap having resilient means engaging said nut for resisting the unscrewing of the cap.

In witness whereof I have hereunto signed my name in the presence of two subscribing witnesses.

FREDERIK NIELSEN.

Witnesses:
P. W. PEZZETH,
E. P. BRANNER.